(12) United States Patent
Haller et al.

(10) Patent No.: US 7,079,990 B2
(45) Date of Patent: Jul. 18, 2006

(54) AUTOMATED CONNECTIONS OF COMPUTER-AIDED DESIGN COMPONENTS

(75) Inventors: Kirk D. Haller, Acton, MA (US); Gary W. Amadon, West Townsend, MA (US); Robert D. Noftle, Wilton, NH (US); David J. Corcoran, Lexington, MA (US)

(73) Assignee: SolidWorks Corporation, Concord, MA (US)

( * ) Notice: Subject to any disclaimer, the term of this patent is extended or adjusted under 35 U.S.C. 154(b) by 532 days.

(21) Appl. No.: 09/781,053

(22) Filed: Feb. 8, 2001

(65) Prior Publication Data

US 2002/0107673 A1 Aug. 8, 2002

(51) Int. Cl.
G06F 17/50 (2006.01)
G06T 17/00 (2006.01)

(52) U.S. Cl. .............................. 703/2; 700/98; 700/182; 345/420

(58) Field of Classification Search .................. 703/1, 703/6, 7, 2, 5; 706/919; 345/964, 420; 700/182, 700/132, 114, 98, 135
See application file for complete search history.

(56) References Cited

U.S. PATENT DOCUMENTS

| | | | | |
|---|---|---|---|---|
| 5,485,390 A | * | 1/1996 | LeClair et al. | 700/182 |
| RE36,602 E | * | 3/2000 | Sebastian et al. | 364/468.03 |
| 6,063,128 A | * | 5/2000 | Bentley et al. | 703/6 |
| 6,434,441 B1 | * | 8/2002 | Beauchamp et al. | 700/98 |
| 6,629,065 B1 | * | 9/2003 | Gadh et al. | 703/1 |
| 6,768,928 B1 | * | 7/2004 | Nagasawa et al. | 700/98 |
| 2002/0046294 A1 | * | 4/2002 | Brodsky et al. | |
| 2002/0109704 A1 | * | 8/2002 | Rajarajan et al. | |
| 2002/0156792 A1 | * | 10/2002 | Gombocz et al. | |

OTHER PUBLICATIONS

CIMLOGIC, Inc., Toolbox Making CAD Easy!, Quick Start Guide, pp. 1-54.

* cited by examiner

*Primary Examiner*—Thai Phan
(74) *Attorney, Agent, or Firm*—Clifford Chance US LLP

(57) ABSTRACT

Construction of a model using a computer aided design system includes constructing a feature in a three dimensional model based on data input by a user. Following construction of the feature, a part configured to compatibly couple with the feature is automatically identified based on design attributes of the feature. The part can be selected from a parts library that includes data representing parts and their geometric characteristics. The part also may be automatically generated based on a part model in a parts library. The part generation can include querying a database storing the part library to retrieve a part model, and then generating an instance of the part model based on design attributes of the feature so as to ensure coupling compatibility with the feature.

29 Claims, 16 Drawing Sheets

AUTOMATED CONNECTIONS OF COMPUTER-AIDED DESIGN COMPONENTS

BACKGROUND OF THE INVENTION

Computer-aided design (CAD) software allows a user to construct and manipulate complex three-dimensional (3D) models of assembly designs. A number of different modeling techniques can be used to create a model of an assembly. These techniques include solid modeling, wire-frame modeling, and surface modeling. Solid modeling techniques provide for topological 3D models formed from a collection of interconnected edges and faces. Geometrically, a 3D solid model is a collection of trimmed surfaces. The trimmed surfaces correspond to the topological faces bounded by the edges. Wire-frame modeling techniques, on the other hand, can be used to represent a model as a simple line drawing. Surface modeling can be used to represent a model's exterior surfaces. CAD systems may combine these, and other, modeling techniques. For example, parametric modeling techniques can be used to define various parameters for different components of a model. Solid modeling and parametric modeling can be combined in CAD systems supporting parametric solid modeling.

An assembly design contains various shapes (e.g., fillets, extrusions, and holes), hereinafter referred to as features. Many times, features are designed with the intent of providing a connection to a particular part. For example, a hole is a feature and may be designed as a connection for a fastener. The design engineer, when designing the hole, typically designs the hole with a specific fastener in mind, which in many cases, is an industry standard part.

When designing an assembly, a design engineer may need to incorporate a standard part in an assembly model. Rather than re-designing a standard part, the part may be retrieved from a database of existing parts. Commercially available component databases contain computer models for standard physical parts. Such databases are referred to as part libraries. Examples of commercially available part libraries are the Genius Fastener Library from Autodesk, Inc. of San Rafael, Calif., the Solid Edge Fastener Library available from Unigraphics Solutions Inc. of St. Louis, Mo., and the SolidWorks Toolbox from SolidWorks Corporation of Concord, Mass. (formally the Toolbox/SE Browser from CIMLOGIC, Inc. of Nashua, N.H.).

The SolidWorks Toolbox part library stores one part model for each class of parts, and a set of features or parameters for each class member. Using the 3D configuration capabilities of the SolidWorks® 2000 software, features and parameters for each unique part are stored as one or more attributes that reference the part model. For example, one configuration may have an attribute that defines a screw's drive head as having a slot or having a profile shaped as a hexagon. The 3D configurations are created as needed during the design process after the valid relationships in the database are displayed in a user interface dialog box and a design engineer selects those relationships desired in the part.

The SolidWorks Toolbox part library is extendable. A part may be added by first selecting a part name from a feature manager design tree or by picking a part in the modeling portion of the window. The design engineer may also modify the existing part library in such a way as to reduce the number of parts that may be retrieved. Reducing the size of the part library may be desirable to reflect existing inventory and to include only those parts that a corporation permits employees to purchase. To reduce the size of the part library, a part may be deleted or a permission necessary to access the part may be removed.

CAD systems that provide an interface to a part library enable design engineers to import pre-defined component parts into the CAD system's modeling space. To import a predefined part, the design engineer must first access the database then initiate a database search for the desired part. Conventional techniques for performing a database search include manual searches by a design engineer. The design engineer may scan an index containing filenames and/or part numbers and then select an item from the index. Alternatively, the design engineer may compose a database query that produces and issues a search command to the database system. The design engineer typically interacts directly with the database program in filtering and selecting among search results.

When the design engineer locates an appropriate part, a preview of the part may be displayed to allow the design engineer to view, and possibly reject, the part, before issuing a command to download the part into the CAD system's modeling space. The download command calls on one or more interface functions (i.e., software that controls communication between the part library and the CAD application), to retrieve the model of the standard part from the database and copy the model of the part to the CAD application's modeling space. After a part is imported into the modeling space, the design engineer may examine and analyze the imported part to be assured that the part is appropriate for the assembly. The part may then be inserted into the assembly model by establishing a connection with a feature in that model.

To insert the part into the assembly model, the part must be positioned relative to a feature in the assembly. The designer may issue commands via the user interface to move the part to the appropriate location within the assembly model and ensure that the part is properly aligned. Alternatively, existing technology may be used to automatically position (i.e., locate and align), a part with respect to a feature. The SolidWorks® 2000 software, available from SolidWorks Corporation of Concord, Mass., can infer mating relationships between a feature and a part by analyzing geometric characteristics of the feature and the part, then determining the correct position (including alignment) of the part with respect to the feature. Such mate inferencing is described in U.S. Pat. No. 6,219,049.

To infer mating relationships, the SolidWorks® 2000 software analyzes a characteristic set of geometries for a chosen part. For example, a bolt may include characteristic geometries of a cylinder for the shank and characteristic geometries of a plane for the face under the bolt's head. Complimentary geometries are then found in the feature, such as a cylindrical hole.

One technique that may be implemented for finding complimentary geometries of a chosen part and a feature is a logic table, in which characteristic geometries are related to mate types. In the logic table, a characteristic geometry, such as an axis, may be related to a concentric mate constraint, whereas a characteristic geometry, such as a plane, may be related to a coincident mate constraint. Possible target geometries that can satisfy mate constraints for the characteristic geometry may then be found using another table that identifies mating geometries. An axis with a concentric mate constraint requires a circular edge or conical face. A plane with a coincident mate constraint may have a mating geometry that is another coincident face. The part is then mated to the feature by positioning the characteristic geometries in the component with respect to target geometries in the feature.

During the modeling process, the design engineer may modify a feature. For example, the diameter of a hole may be enlarged or the depth of a hole may be increased. In either case, the part may no longer be appropriate for the feature. The design engineer may also decide to replace a part that was retrieved from a part library with another part in the library, which may cause the feature and newly retrieved part to become incompatible.

The design engineer must maintain the connection between the feature and the part when either the feature or the part is modified. If the design engineer changes the characteristics of the hole, a new fastener must be found and incorporated into the assembly model using the manual process previously described. If the design engineer changes characteristics of the fastener, the hole may need to be modified to account for the fastener's changed characteristics.

Before a feature is modified or a part is exchanged, the engineer must first remove the component that is no longer needed, then repeat the interactive process of incorporating a database component in an assembly model. Thus, the engineer must access the database application, find an appropriate part in the database, download the appropriate part from the database into the CAD system, and position the part with respect to a feature in the assembly.

One limitation of part selection and integration in a typical CAD systems is the speed and accuracy in which a part can be retrieved from a part library and integrated into an assembly model. This limitation results from the active role of the design engineer in selecting the part and integrating it with the model. The design engineer may need to use trial and error techniques to retrieve a part, or may need to re-measure the feature before retrieving an appropriate part (e.g., in the event that the design engineer cannot recall the correct size of the feature). Furthermore, typical CAD systems do not have a mechanism for establishing and maintaining an association between a feature and a connecting part in the part library. Although, a feature may be automatically created after a design engineer describes the feature, the description is not utilized to describe a part, or set of parts, that may connect to the described feature.

An example of automated feature creation is found in the SolidWorks® 2000 CAD system. Solidworks 2000 can automatically create holes using a feature generator known as the hole wizard tool. The hole wizard tool can define a hole feature based on a series of parameters specified by the user. For example, a ¼" counterbore through-hole has an attribute that specifies the diameter of the hole and contains a value that is appropriate so that a ¼" screw can fit without interference, an attribute that specifies the style of the hole and contains the value "counterbore," and an attribute that specifies the depth of the hole and contains a value that is automatically calculated by the system after the system determines if the hole is a "through hole" or a "blind hole." ("Through holes" pierce an object, whereas "blind holes" end before penetrating an object.) The appropriate hole feature, having an appropriate depth, is automatically generated by dimensioning a sketch of the hole feature in accordance with the specified parameters and preset parameters (e.g., chamfer angle). The parameters specified using the hole wizard tool become attributes that are contained in the data structure that defines a hole. However, the attribute is only used to geometrically recreate the feature for display purposes and to enable the design engineer to edit the parameters of the hole. To identifiy a fastener that fits the created hole, the design engineer must manually compose a database query that includes the parameters specified using the hole wizard tool.

Some commercially available CAD modeling systems integrate or interface to component databases, and some aid in the initial placement of those components by locating and aligning the component. However, modeling systems do not have the ability to find the features and automatically populate the features by retrieving a database component and placing that database component in an appropriate location with respect to the feature. Additionally, modeling systems do not have the ability to maintain the connection between a feature and a part that was initially retrieved from a database.

SUMMARY OF THE INVENTION

In one aspect, the invention is designed to provide a unique interface between a computer-aided modeling system and a database system that can automate part selection and integration with a model designed using a computer aided design (CAD) system. The unique interface is realized through an automated connection mechanism that infers the purpose of a model feature created by a user, and can automatically identify other model components compatible with the feature. For example, the system can infer that a collection of hole features created by a user will be filled by compatible fastener parts, and the system can automatically identify such compatible fasteners parts. These parts may be located in a library of standard parts or dynamically configured based on a part model.

In general, in one aspect, the invention features a computer-implemented method for construction of a model using a computer aided design system. The method includes constructing a feature in a three dimensional model based on data input by a user. Following construction of the feature, a part configured to compatibly couple with the feature is automatically identified based on design attributes of the feature. The part can be selected from a parts library that includes data representing parts and their geometric characteristics. In another aspect, the invention can automatically generating a part or other model component that can be coupled to the feature. The part generation includes querying a component model repository (i.e., a model library) to retrieve a component model. The model is retrieved based on compatibility between an attribute of the component model and a design attribute of the feature.

Implementations may include one or more of the following features. The part may be selected from a parts library and automatically positioned in a coupling relationship with the feature. The part may be generated based on a part model having an adjustable geometry. The generated part may then be stored in the part model library for reuse. The model data may details construction of the design model based on a hierarchical relationship among components, the components being selected from the group consisting of a part, an assembly, and a subassembly. Constructing a part or component from a parts model may be done by associating configuration data with an instance of the model, the configuration data representing a value of a modifiable attribute of the model. The inventions described herein may be embodied in computer systems and computer readable media.

The details of one or more embodiments of the invention are set forth in the accompanying drawings and the description below. Implementations can include one or more of the following advantages. An automated connection mechanism automates the process of finding standard part models in a database and incorporating the standard parts in an assembly model, thereby encouraging the use of standard industry parts that may be contained in a commercially available database. An automated connection mechanism notifies the design engineer when a modification of the assembly model causes a part to become incompatible with respect to a feature within the assembly. The design engineer then may command the system to perform another automated search for an appropriate part in the database. Furthermore, the automated connection mechanism may be extendible, allowing a design engineer to expand the database as needed. Efficiency, flexibility, and functionality of a computerized modeling system may be enhanced. Other features, objects, and advantages of the invention will be apparent from the description and drawings, and from the claims.

DETAILED DESCRIPTION OF THE INVENTION

Figure 1:
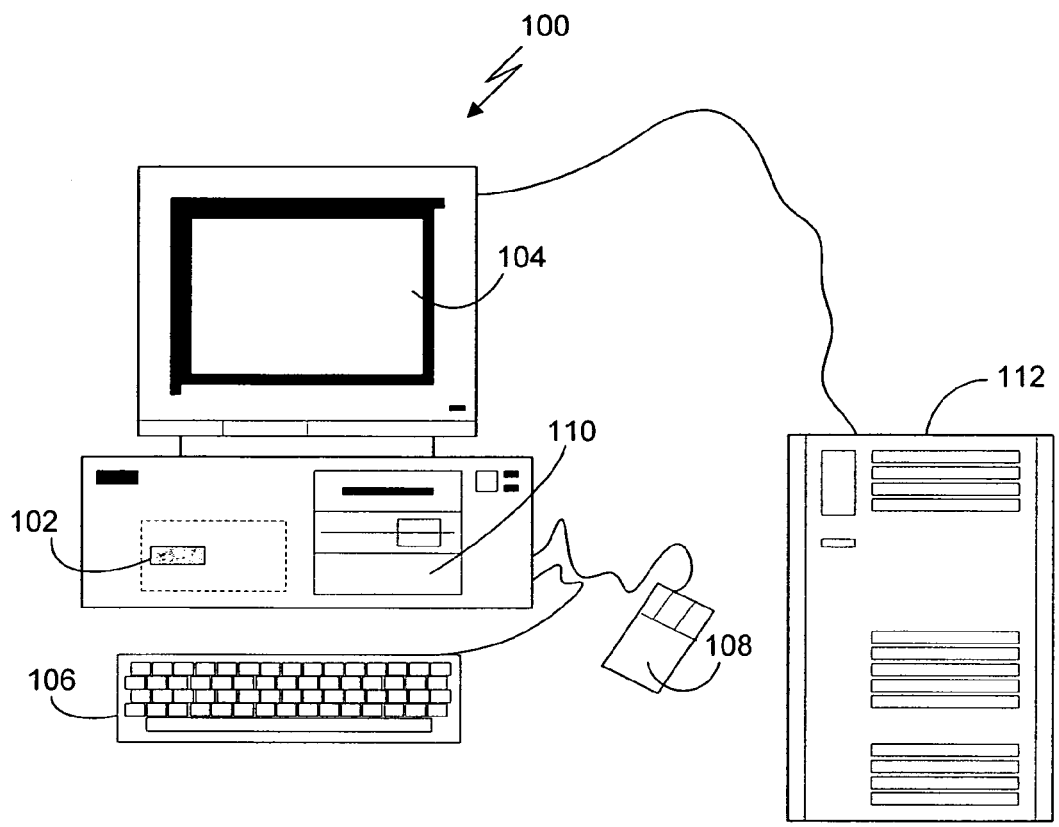
FIG. 1 is a diagram of a computer system.

FIG. 1 shows a computerized modeling system 100 that includes a CPU 102, a CRT 104, a keyboard input device 106, a mouse input device 108, and a storage device 110. The CPU 102, CRT 104, keyboard 106, mouse 108, and storage device 110 can include commonly available computer hardware devices such as a Pentium-based processor. The mouse 108 has conventional left and right buttons that the user may press to issue a command to a software program being executed by the CPU 102. Other appropriate computer hardware platforms are suitable as will become apparent from the discussion that follows. Such computer hardware platforms are preferably capable of operating the Microsoft Window NT, Windows 95, Windows 98, Windows 2000, or UNIX operating systems.

Computer-aided design software is stored on the storage device 110 and is loaded into and executed by the CPU 102. The computer-aided design software allows the user to create and modify a 3D model and implements aspects of the invention described herein. The CPU 102 uses the CRT 104 to display a 3D model and other aspects thereof as described later in more detail. Using the keyboard 106 and the mouse 108, a user can enter and modify data for a 2D or 3D model. The CPU 102 accepts and processes input from the keyboard 106 and a mouse 108. The CPU 102 processes the input along with the data associated with the 2D or 3D model and makes corresponding and appropriate changes to the display on the CRT 104 as commanded by the modeling software.

External database software may also be stored on the storage device 110 and loaded into and executed by the CPU 102. Alternatively, external database software may run on a separate hardware platform 112 that is included via network hardware and software in the computerized modeling system 100. The separate hardware platform 112 includes a CPU and a storage system, among other computer components.

A CAD application, executing on the CPU 102 may contain the database software directly in the CAD application, or may spawn a database program as a subordinate process. Alternatively, the database program may be installed as a server software process in the same or a different computer system, or may be dynamically linked to the CAD application.

In one embodiment, an external database (also known as a part library), is an add-in, which is a software program that extends the capabilities of another software program, such as a CAD application. One implementation of the external database uses Microsoft Object Linking and Embedding (OLE) technology to link an external database to the CAD application. The external database may also be a dynamically linked library (DLL), meaning that the database is linked to the CAD application at run-time rather than being linked with the CAD application at compile time. Many other database interfaces may be used, e.g., Microsoft Open Database Connectivity (ODBC), Structured Query Language database interfaces, and simple flat-file databases.

Figure 2:
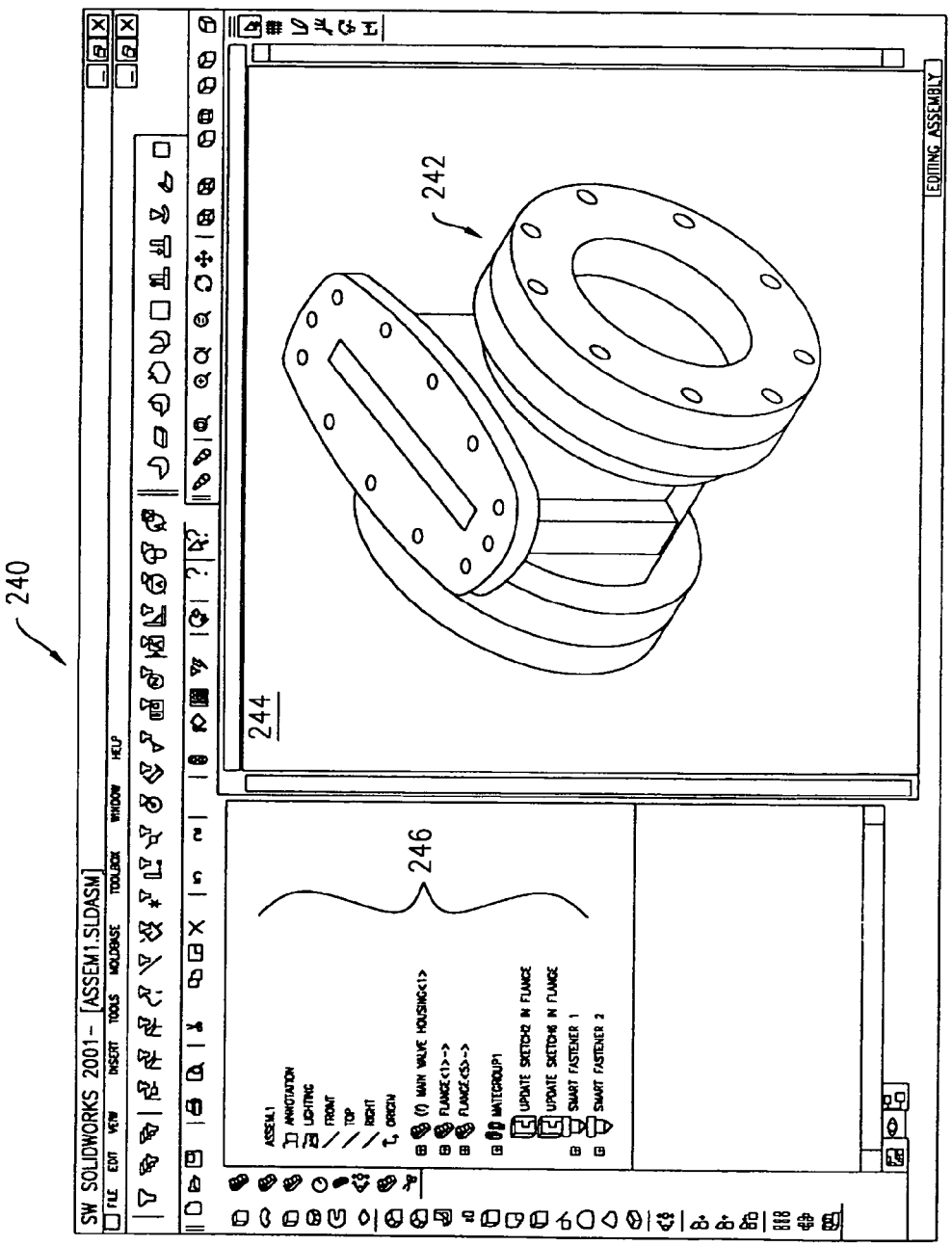
FIG. 2 is an illustration of an image on the CRT.

FIG. 2 shows a display generated on the CRT 104 by CAD software. The display includes a window 240 subdivided into a modeling portion 244 in which a 3D model 242 is rendered. A user can construct and modify the 3D model 242 in a conventional manner. The surfaces of the 3D model 242 can be displayed, or the 3D model 242 can be rendered using solid lines and dashed lines to show visible edges and hidden edges, respectively, of the 3D model. Implementations may also include other window areas, such as a feature manager design tree 246, which helps the user visualize and manipulate the model 242, shown in the modeling portion 244, as well as components of the model 242.

Figure 3:
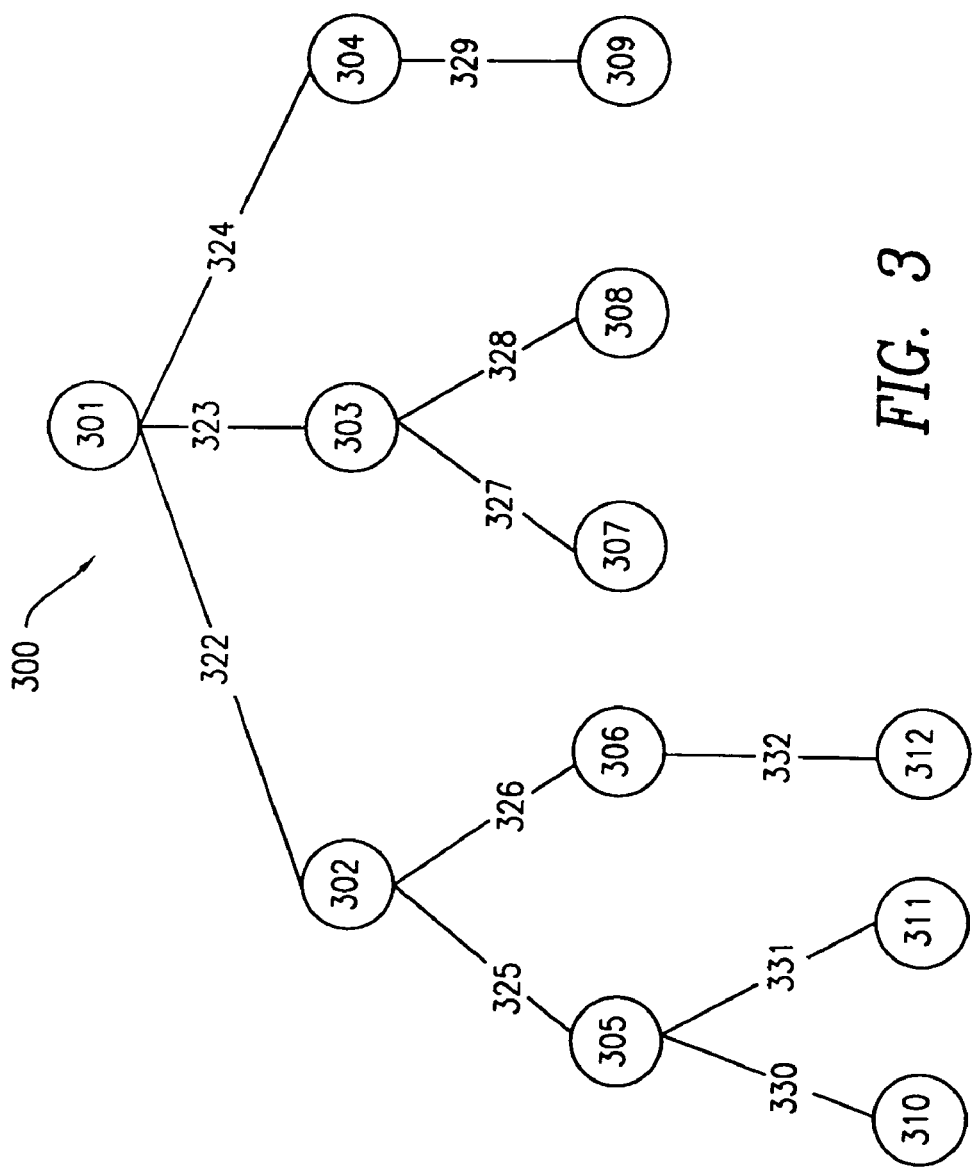
FIG. 3 is an illustration of a hierarchical data structure.

A CAD system may represent a 3D model using a hierarchical data structure. Hierarchical data structures can be used to represent solid models as combinations of components such as geometry, topology, operations, transformations, assemblies, subassemblies, parts, and other model data. FIG. 3 shows a hierarchical data structure known as a tree. The tree 300 includes nodes 301–312 arranged in parent-child relationships that identify model components and express relationships between modeled components. For example, node 310 may represent one part in a model, node 311 may represent a second part in the model, and their parent node 305 may represent a subassembly that contains the two parts. Thus, node 305 defines a relationship between its descendents that results in the formation of an object that is a subassembly. A modeled object may be represented by a root node 301 and nodes 302–312 connected to the root node 301. Modeling software can construct (or render) a modeled object by traversing ("walking") the nodes in the hierarchical data structure 300. Walking the nodes 301–312 can include performing a breadth-first or depth-first traversal of the nodes 301–312 to locate descendent nodes of any given ancestor node. The model may then be constructed by performing the operations represented by the ancestor and descendent nodes.

While a design engineer is building a model using a CAD software system, features are constructed with the intention that a particular part will connect to a particular feature. The design engineer may capture his or her design intent by describing the intended use of the feature and having the description stored in the feature's data structure. Such descriptions that encapsulate the design intent of a feature are hereinafter referred to as descriptors. In one embodiment, the descriptor is a set of attributes that when taken together may be conceptualized as a descriptive text string. For example, the string 'ANSI inch ¼" socket head cap screw 1.85" through hole' represents descriptor attributes for a standard, size, type, and length, which together contain design intent of a hole feature. Other embodiments may encode descriptors as a single attribute.

The automated connection mechanism is driven by descriptors. A descriptor is stored in a feature's data structure when the design engineer creates the feature. The descriptor is later used to find and retrieve a standard part, for which the feature was designed, from a part library. To find and retrieve a standard part, the descriptor associated with the feature is used to automatically construct a database query that identifies a set of records in the part library. Thus, parts are selected from the parts library by matching (in whole or in part) attributes derived from a feature's descriptor with attributes of pre-defined standard parts models.

One method for ensuring that the feature descriptors and the keys in the part library match one another is to have the descriptors created automatically by a feature generator, such as the SolidWorks® 2000 hole wizard tool. The present invention extends the capability of the hole wizard tool to build a descriptor that stores the design intent of a feature for purposes beyond geometric re-creation and editing operations.

Figure 4:
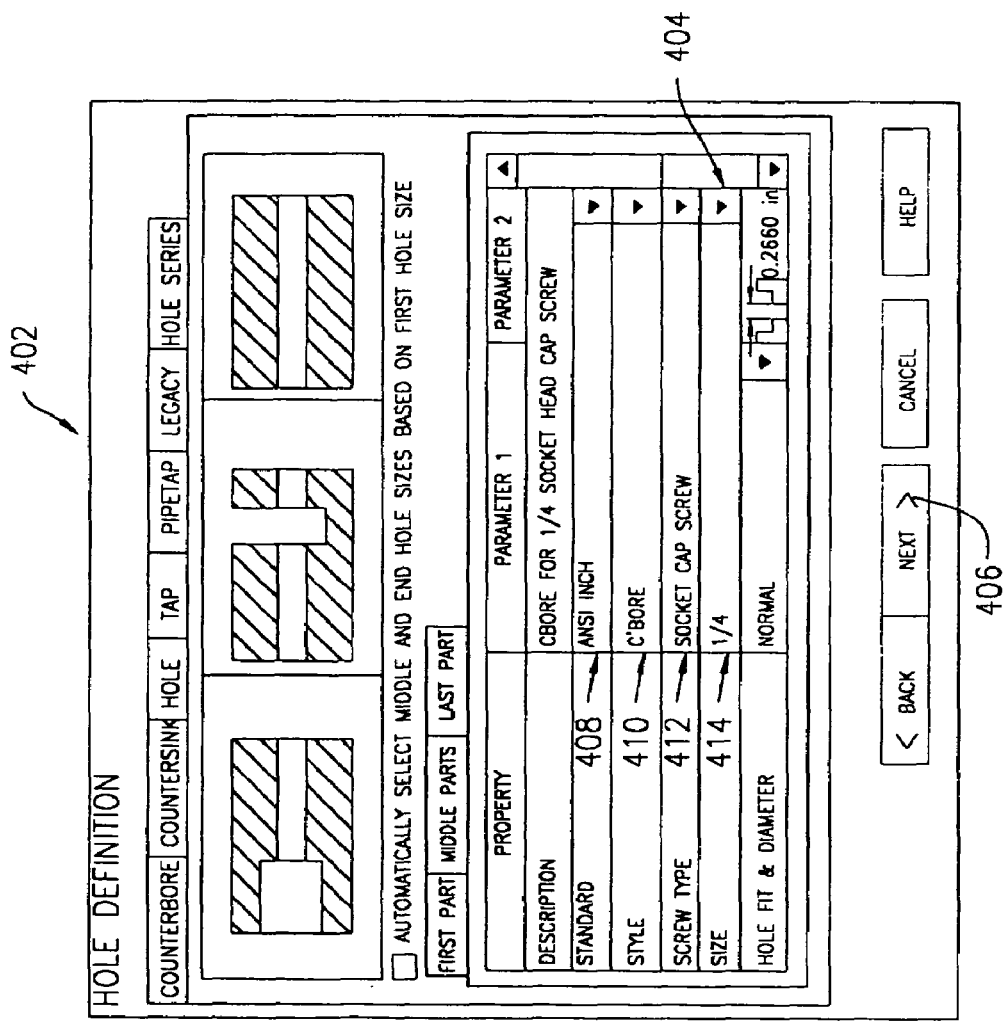
FIG. 4 is an illustration of a hole wizard tool.

FIG. 4 shows the hole wizard tool's graphical user interface as extended to meet the requirements of the present invention. As shown in FIG. 4, a hole definition dialog box 402 displays a set of property names and one or more parameters for the properties. A parameter value may be chosen from a pull-down menu, such as the pull-down menu 404, that contains a list of acceptable values for the respective property. Pressing the Next button 406 instructs the system to continue creating the hole feature, which includes building a descriptor. The descriptor may be built by storing the parameters of one or more properties as feature attributes. The properties encapsulated in the descriptor may include a property that specifies an industry standard 408 (e.g., ANSI Inch, ISO, or DIN), and properties that specify a hole style 410, a fastener type 412, and a fastener size 414.

In one embodiment, two databases are present. One database is a feature database and contains data used to model standard features, such as holes. The feature database may be an integrated component of the software module that generates a feature, such as a component of the hole wizard tool. The second database is a part library, which is a collection of parts. The part library contains data used to create models of standard components and is indexed by the descriptors that may be constructed by a feature generator.

Figure 5A:
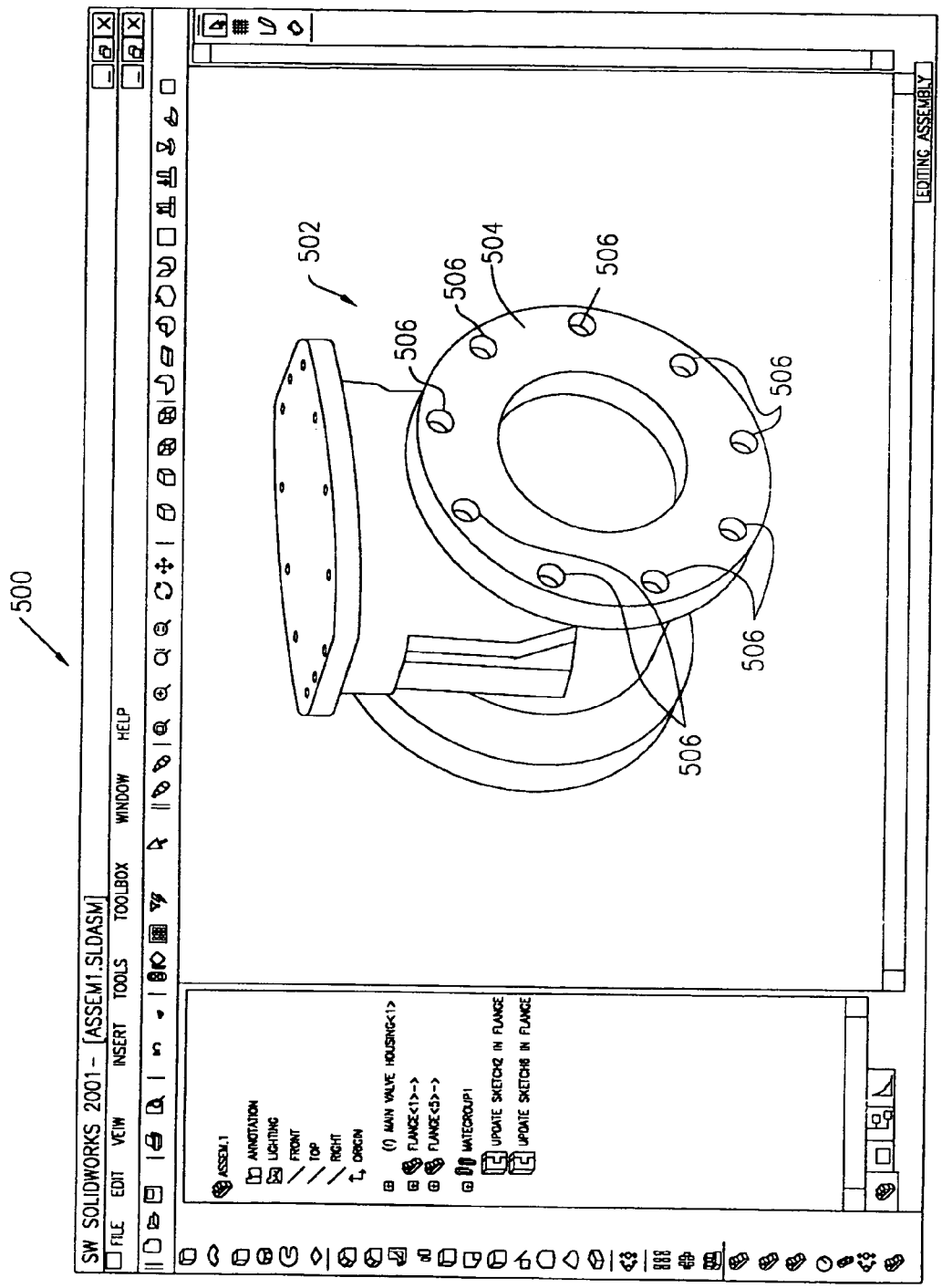
FIG. 5A is an illustration of an image on the CRT.
Figure 5B:
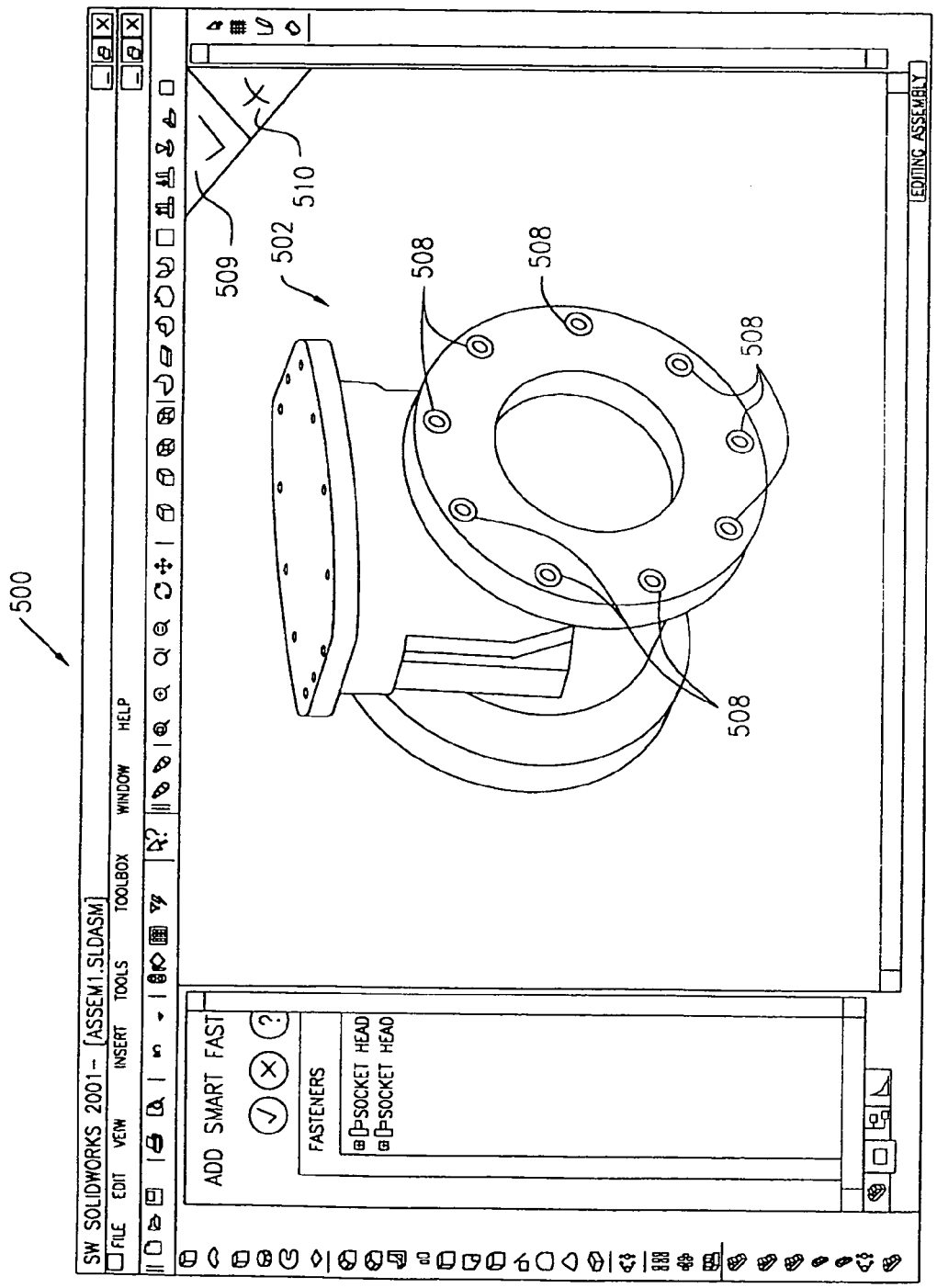
FIG. 5B is an illustration of an image on the CRT having connectors.

FIG. 5A shows an image of an assembly 502 displayed in a window 500. The assembly includes a flange 504 that contains a pattern of holes 506. The automated connection mechanism may automatically select a fastener and populate all the holes 506 in the flange 504 with that fastener. This operation may be performed without any intervention from the design engineer. FIG. 5B shows an image of the assembly 502 in the window 500 after the pattern of holes are automatically populated with connectors 508. The connectors may all be the same part because all the holes in the pattern are the same size.

Figure 6:
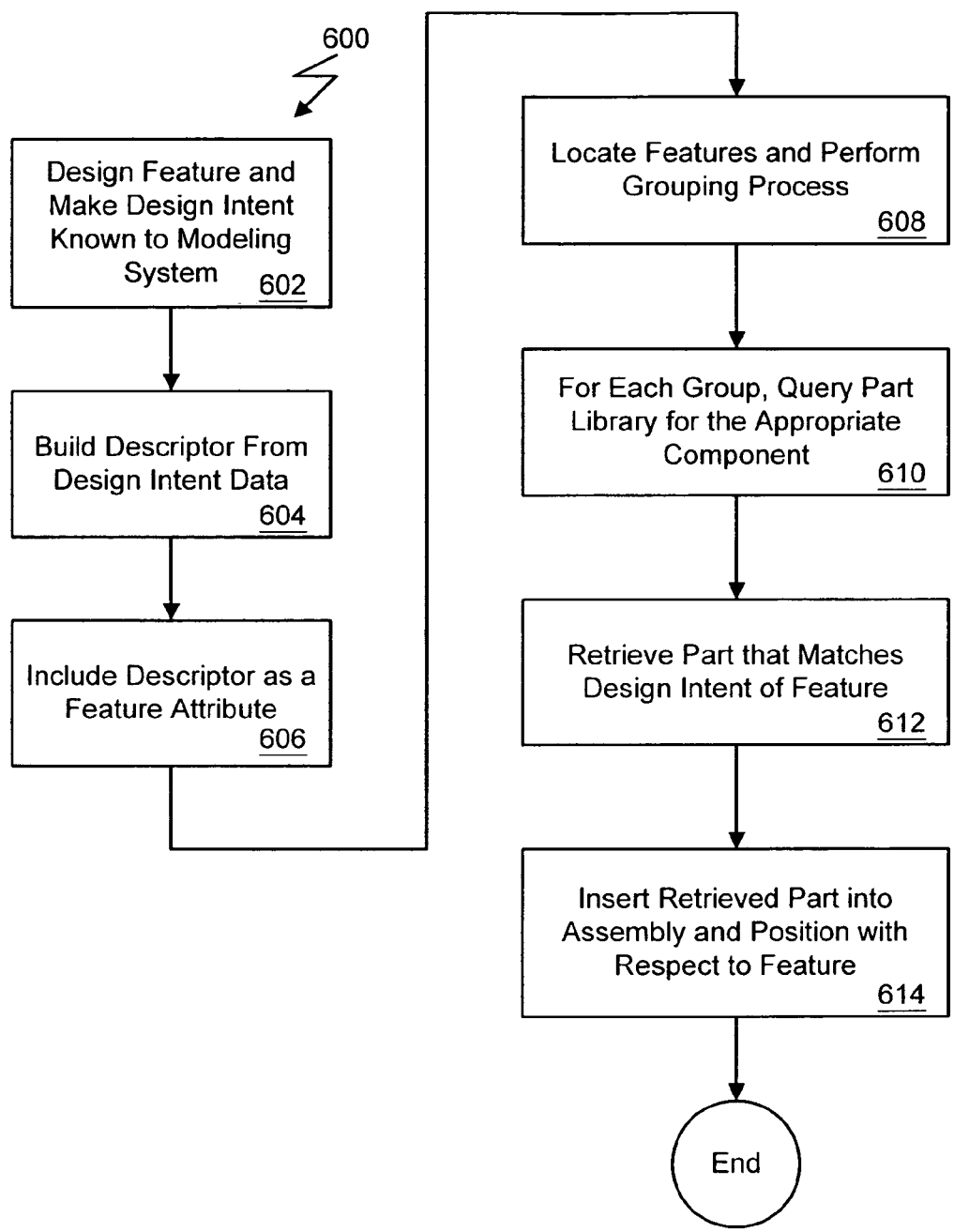
FIG. 6 is a flow chart of steps that connect a part to a feature.

Referring to FIG. 6, a flow chart shows a procedure 600 that automatically selects a part compatible with a feature designed by a design engineer and couples that part to the feature. To begin the procedure 600, a design engineer designs a feature that is intended as a receptacle for a particular part, and the design intent is made known to the modeling system (step 602). As previously described, a hole wizard feature generator may be used to express design intent. The modeling system then builds a descriptor from the design intent data (step 604), and associates the descriptor as an attribute in the feature's data structure (step 606). Descriptors may be associated with a feature in a number of ways, e.g., including descriptor data directly in a feature's data structure, by using pointers or links between the descriptor data and the data structure, or by using database keys or other information to associate the descriptor and feature data.

When one or more features need to be populated with connectors, the automated connection mechanism locates features within a scope specified by the design engineer and performs a process that organizes the features into groups (step 608), which will be discussed later in more detail. The part library is queried once for each group of features, with the goal of retrieving a part that is appropriate for the group (step 610). The retrieved part may be used once as a connector for the entire group, such as a group that is a set of coaxial and concentric holes, or the part may be used multiple times to populate all features in the group, such as a group that is a pattern of holes.

More than one part in the part library may be appropriate for populating a group of features. Therefore, the automated connection mechanism determines the best companion part for the feature, which is a decision that the design engineer may override. For example, in one embodiment, the automated connection mechanism reviews a list of valid lengths for a family of parts. Before retrieving a part, the automated connection mechanism determines which length would provide the best fit. If an appropriate length does not exist, a new configuration of the part family (within the specifications of the part library), is generated and stored. In the next step of procedure 600, a part that matches the design intent of the feature is retrieved from the part library (step 612) and automatically inserted into the assembly model at a location determined by a positioning procedure (step 614). User intervention to retrieve and position the part is not required.

The insertion and positioning procedure may utilize the mate inferencing technology described in U.S. Pat. No. 6,219,049. As previously discussed, mate inferencing technology determines compatible geometric characteristics of the feature and the part by analyzing a characteristic set of geometries for a part, locating complementary geometries in a feature via one or more table lookup operations, then correctly positioning the part with respect to targeted geometries in the feature.

The design engineer has the option of accepting or rejecting the part selection. After the part is retrieved from the part library and inserted into the assembly, a checkmark (i.e., acceptance) symbol 509 and a cross (i.e., rejection) symbol 510 appear in the user interface, as shown in FIG.

5B. The design engineer may accept the part by clicking a mouse button while the cursor is over the checkmark, or may reject the part by clicking a mouse button while the cursor is over the cross symbol. Additionally, if not satisfied with the retrieved part, the design engineer may alter the part after the part is inserted in the assembly. If a part is modified, the modified configuration of the part may be added to the part library.

Figure 7:
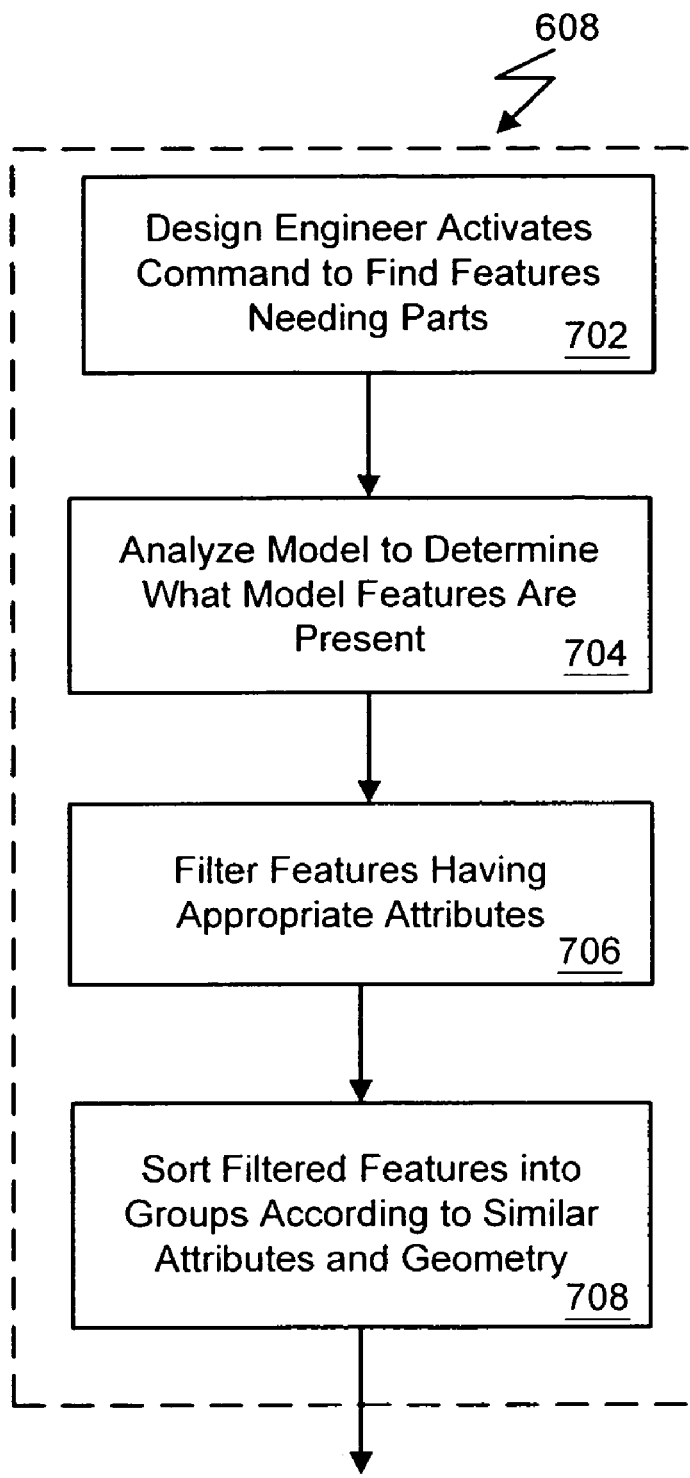
FIG. 7 is a flow chart of steps that perform a grouping process.

FIG. 7 is a flow chart that describes step 608 of FIG. 6 in more detail. In FIG. 7, procedure 608 locates a set of features (e.g., features having descriptors or features that the system can identify as a particular feature), and performs a process that recognizes and groups similar features in the set. The procedure 608 is an event-driven mechanism activated by an external event. For example, the design engineer may activate a command that begins the process of locating features and populating those features with appropriate parts from a part library (step 702). The command may be activated in a conventional manner, such as selecting an item from a pull-down menu using a mouse device. Alternatively, the design engineer may choose the features to populate by selecting the specific features or by selecting one or more faces in the model using a mouse device.

Pressing a button in a feature generator dialog box may also trigger an event that activates the procedure 608. The button may be pressed after a feature's design intent is specified, in which case, the scope of the database search may be limited to the feature being specified. The modeling system may then automatically build the descriptor, create the feature, and connect a part retrieved from a part library to the feature without any intermediate intervention from the design engineer.

When more than one feature is to be populated, the assembly model is analyzed to determine what features are present (step 704). Features are recognizable because the process that generates the features stores a tag that identifies the features (e.g., holes, fillets, and extrusions). As each feature is recognized, a filtering process collects identifiers for all features that have attributes determined to be appropriate due to the scope of the search (step 706). Examples of such features with appropriate attributes may be all holes having an attribute that contains the string "standard," all holes that have descriptors, or all cylindrical extrusion cuts. For those features having appropriate attributes, a collection and sorting process forms logical groups of features that have similar geometry and attributes (step 708).

A logical grouping of features may cause the automated connection mechanism to recognize a series of holes positioned in such a way that one screw can pass through each hole in the series. For example, a logical group may consist of a pattern of holes aligned with a second pattern of holes in such a way that a hole from the first pattern is concentric and coaxial with a hole from the second pattern. If the holes have a common direction, a lexicographical sorting process uses the center of each hole in the group to determine the alignment of the holes. The centers are first sorted according to their x coordinate, then according to their y coordinate, then according to their z coordinate. If two or more holes are aligned, the procedure 608 infers that those holes were designed as a connection for one part, e.g., a screw, bolt, pin or other fastener.

Referring back to FIG. 6, upon completion of the grouping process (step 608), the part library is queried to find and retrieve the appropriate part for each collection of grouped features (step 610). The parts are then retrieved (step 612) and inserted into the assembly (step 614), as discussed.

In some implementations, the underlying data structures that support 3D assembly models are not only hierarchical, but are also object-oriented. In an object-oriented program environment, a class defines a set of objects that have similar data structures, properties, and methods. An object is created as an instance of a particular class. For example, a screw may be an instances of particular class of screw, the class being defined by a model with variable parameters. A particular instance of a class (i.e., a particular type of screw) may be defined by configuration data that configures variable parameters of the screw's model. In such an implementation, the data structure of each part in the part library contains a configuration object that includes a pointer to a model object. The configuration object modifies the model object in some way. For example, the model of a screw may have configurations that modify the shape and size of the head of the screw, and the length of the screw. A configuration may also define a generic screw, as specified by the design engineer. The use of configurations permits the same model to have numerous unique sets of parameters. The use of configurable models allows parts to by dynamically created by the system.

Figure 8:
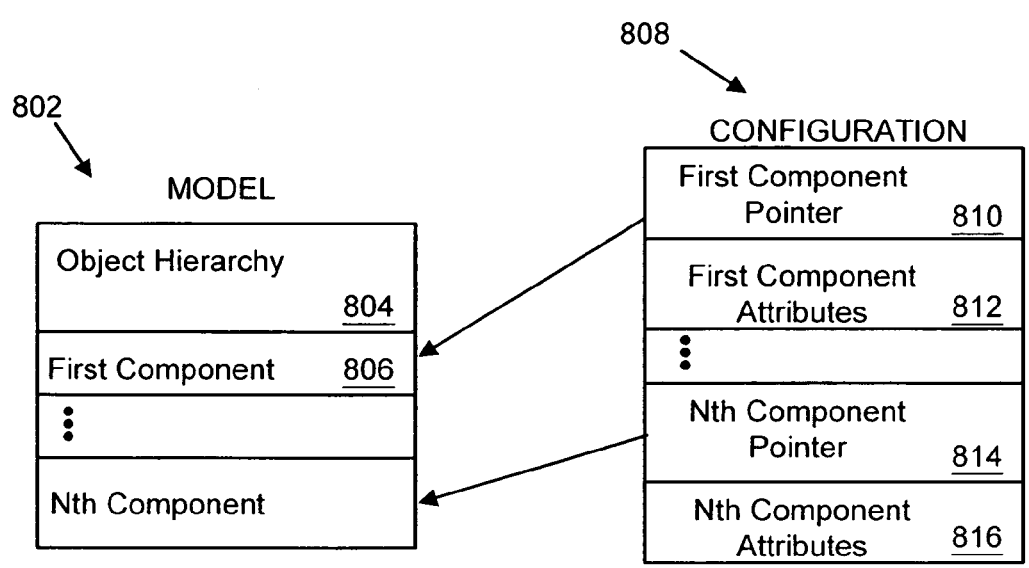
FIG. 8 is a diagram of a model object and a configuration object.

Referring to FIG. 8, the data structures for an object of the model class and an object of the configuration class are illustrated. The model object 802 defines all the model's characteristics, including the model's object hierarchy 804. The components in a model object, such as first component 806, determine whether the model object defines a part or an assembly. If the model object contains only one component, the model object defines a part; otherwise, the model object defines an assembly. A component (e.g., first component 806), stored in the model object may contain data that defines the component's geometry or may contain a pointer to another data structure that stores the data that defines the component's geometry.

Configuration objects are constructed with references to components in a model object, and a set of unique attributes for the particular configuration. As illustrated, an object that is an instance of the configuration class 808 contains a first component pointer 810 and an Nth component pointer 814 that refer to components in the model object, and attributes 812/816 that further specify parameters for the components.

When a part retrieved from the part library is inserted into an assembly model, a copy of the part's model object 802 and a copy of the part's configuration object 808 are added to the hierarchical data structure that defines the assembly model. After the part's model object 802 and configuration object 808 are added to the assembly model, the part is correctly positioned with respect to the feature. In situations where the same part is being used in the assembly model more than once, the model object 802 and the configuration object 808 are stored once and instanced for each reuse, thus conserving memory usage.

In one embodiment, the part library contains a relational database. A relational database stores data in related tables. A database query is constructed from the attributes in the descriptor to locate records in the related tables.

Figure 9:
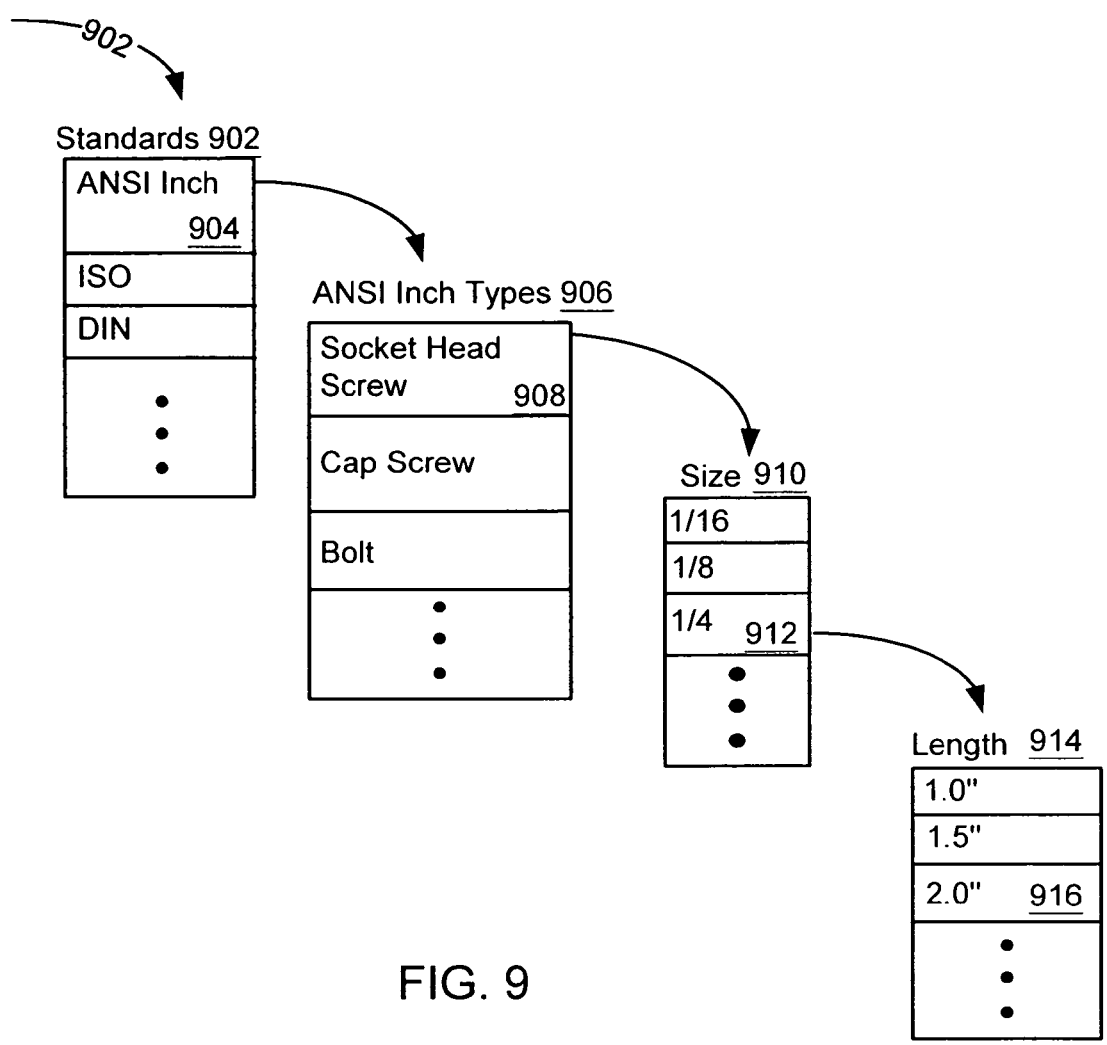
FIG. 9 is an illustration of tables in a relational database.

Referring to FIG. 9, an example of the sequence of relational database lookup operations is shown. In the example, the descriptor is 'ANSI inch ¼" Socket Head Cap Screw 1.85" through hole.' The automated connection mechanism determined the length after ascertaining the depth of the hole and whether the hole is a through hole or a blind hole. If the hole is a through hole, the length of the screw should be greater than the depth of the hole; whereas, if the hole is a blind hole, the length of the screw should not exceed the depth of the hole.

Descriptor attributes are used in a prioritized order to locate records in the relational database tables. The attribute having the highest priority is the standard. Thus, the standard table 902 is searched for the record ANSI inch 904. The next table searched is the ANSI inch type table 906, which is searched for a socket head cap screw record 908. Type tables also contain the name of the model. Thus, in this example, when the socket head cap screw record 908 is found, the name of the model for the family of socket head cap screws is retrieved and the model may be located within the part library.

Next, the socket head cap screw size table 910 is searched for a record containing the size ¼ inch 912. After the size is found in the socket head cap screw size table 910, the length table 914 is searched for the length ascertained by the automated connection mechanism. If the length is not found in a record, the automated connection mechanism selects a length greater than the ascertained length for a hole that is a through hole, or selects a length less than the ascertained length for a hole that is a blind hole. In this example, the length is described as 1.85" through hole, and thus, the record 916 having the length 2.0" is retrieved.

Before creating a configuration, the automated connection mechanism ensures that the configuration does not already exist. Configurations have unique names that identify the combination of values that will modify the model. The automated connection mechanism searches for the unique name and if found, a configuration does not need to be created. Other means of determining whether a configuration exist can be used (e.g., comparing attributes of a designed feature with attributes of model configurations). If a required configuration of a model does not exist, a configuration may be created using the values retrieved from the size table 910 and the length table 914. The configuration stores the values for the size and length retrieved as attributes, which are used to modify a component specified in the model.

If the query does not locate a record in a table, a generic value may be used. The generic value may be a default value that was pre-defined by the system or a generic value specified by the user. One generic value that contains default values for all descriptor attributes may be available, or one generic value may be available for each table.

Another aspect of the present invention is that given the new association between the part and the feature, standard accessory components may be automatically retrieved from the part library and added to the assembly model. Standard accessory components contained in the part library include such parts as nuts and washers.

Each part in the database is indexed by properties of other parts with which the former part may be connected. Thus, the design engineer can embellish the connection to include top-side and bottom-side accessory components, such as a washer at the top of a screw, and a washer and lock nut at the bottom of a screw. The part and the part's accessory components may be re-used with additional features by instantiation operations.

Figure 10A:
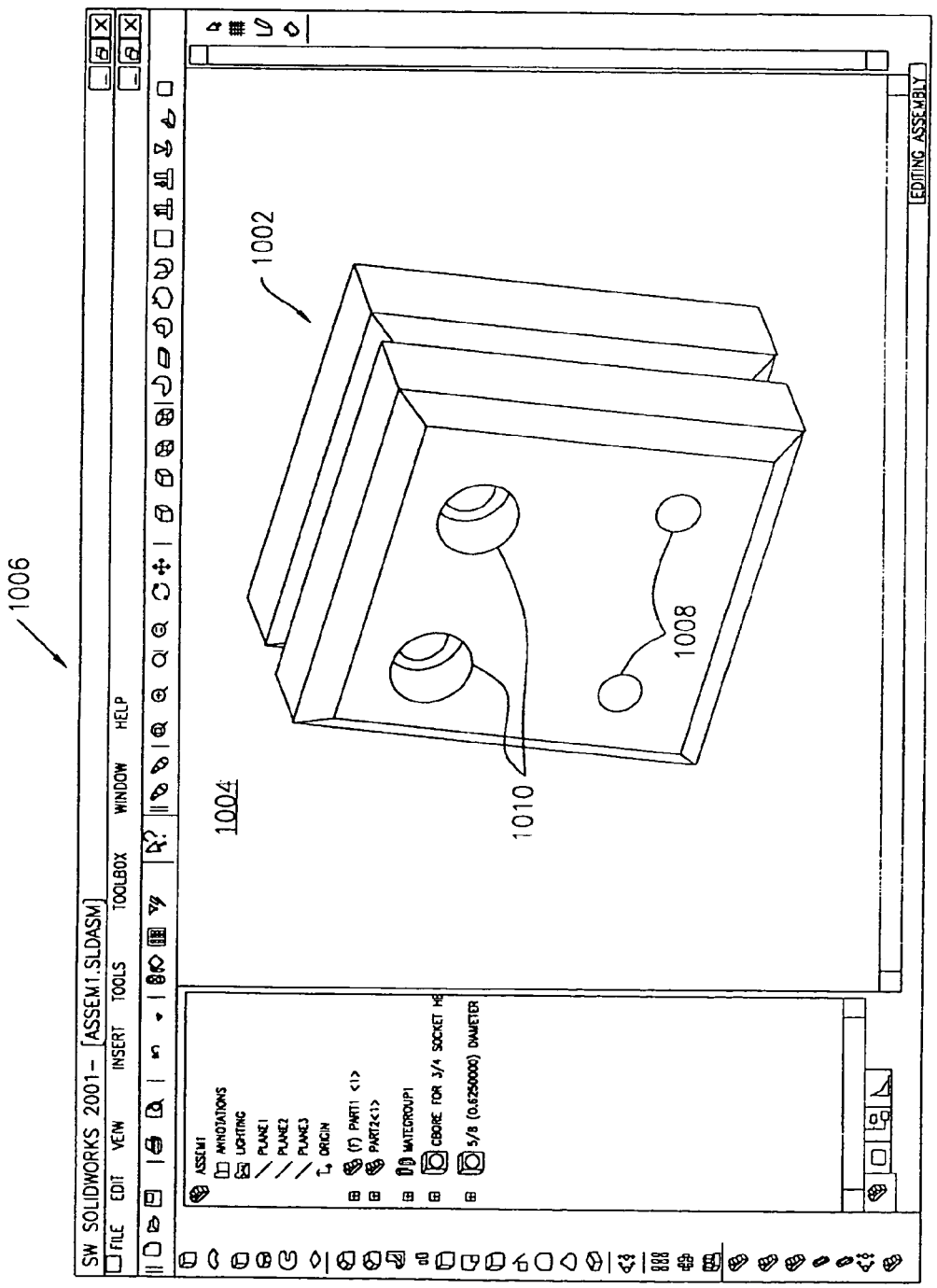
FIG. 10A is an illustration of an assembly prior to having accessory parts added.
Figure 10B:
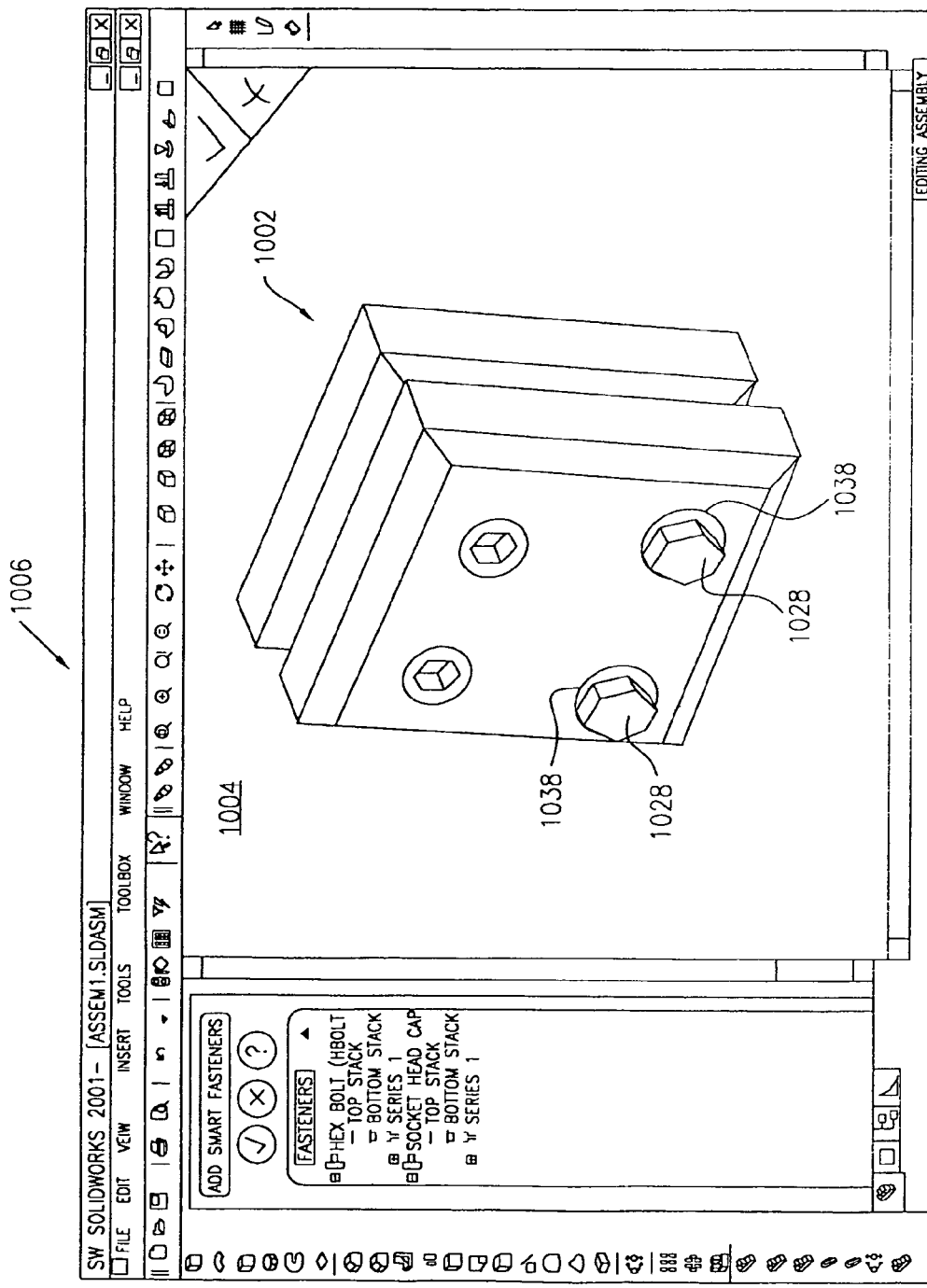
FIG. 10B is an illustration of an assembly after top-side accessory parts are added.
Figure 10C:
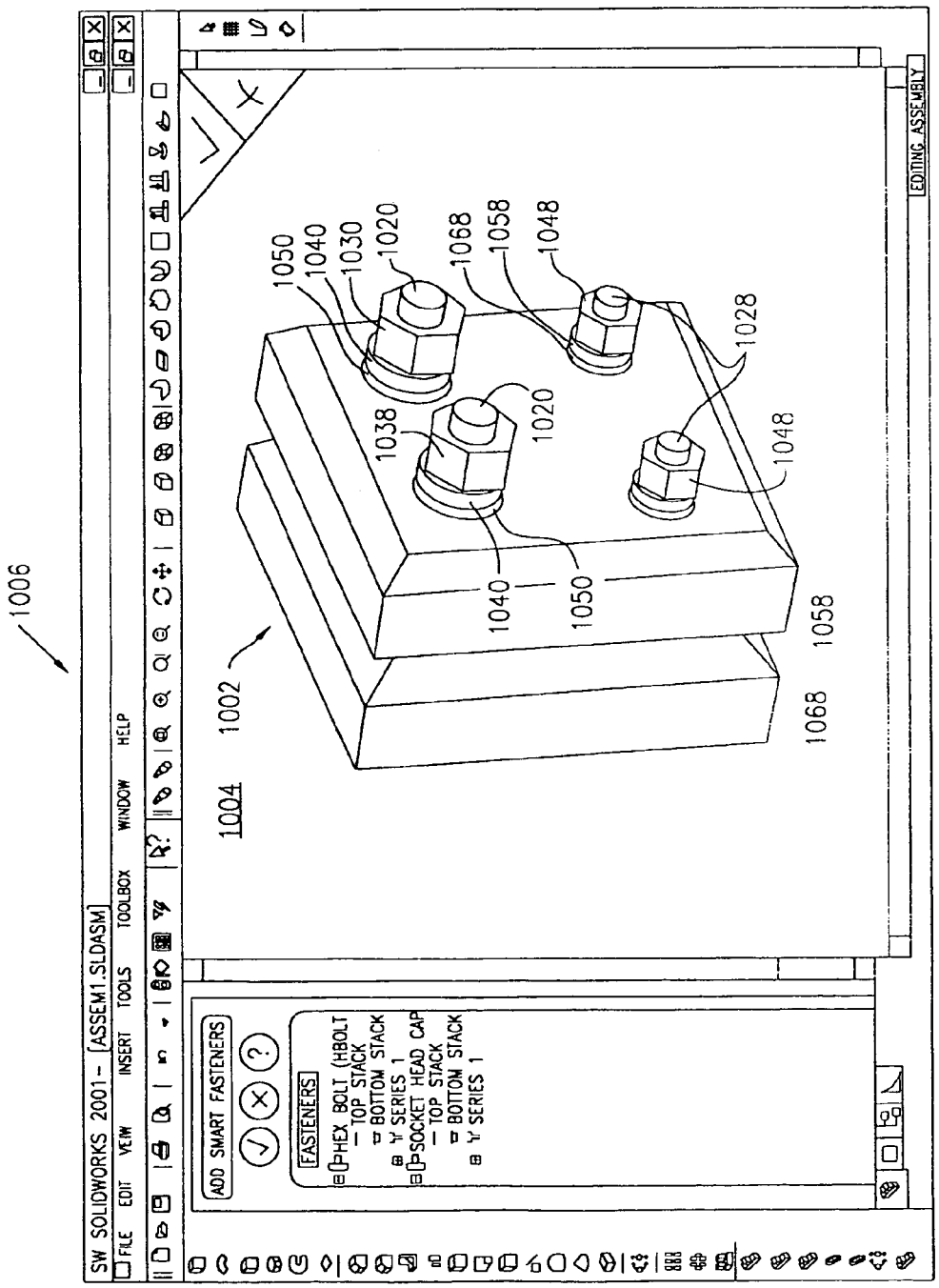
FIG. 10C is an illustration of an assembly after bottom-side accessory parts are added.

Referring to FIG. 10a, an assembly 1002 is shown in a modeling portion 1004 of a window 1006. The assembly 1002 has hole features, two of which are through holes 1008 and two of which are counter-bored holes 1010. After the hole features 1008, 1010 are created, the system may perform process 600 to automatically select hex bolts to populate the holes 1008 and socket head cap screws to populate the holes 1010. FIG. 10b shows the assembly 1002 in the modeling portion 1004 of the window 1006 after the hex bolts 1028 are inserted in the holes 1008 and accessorized with washers 1038. The washers 1038 may be referred to as top-side accessory components. Generally socket head cap screws, used to populate counter-bored holes 1010, do not have top-side accessory components. FIG. 10c shows a back-side view of the assembly 1002 in the modeling portion 1004 of the window 1006. The hex bolts 1028 have bottom-side accessory components, which are nuts 1048 and two sets of washers 1058, 1068. The socket head cap screws 1020 have also been accessorized with nuts 1030 and two sets of washers 1040, 1050.

Figure 11:
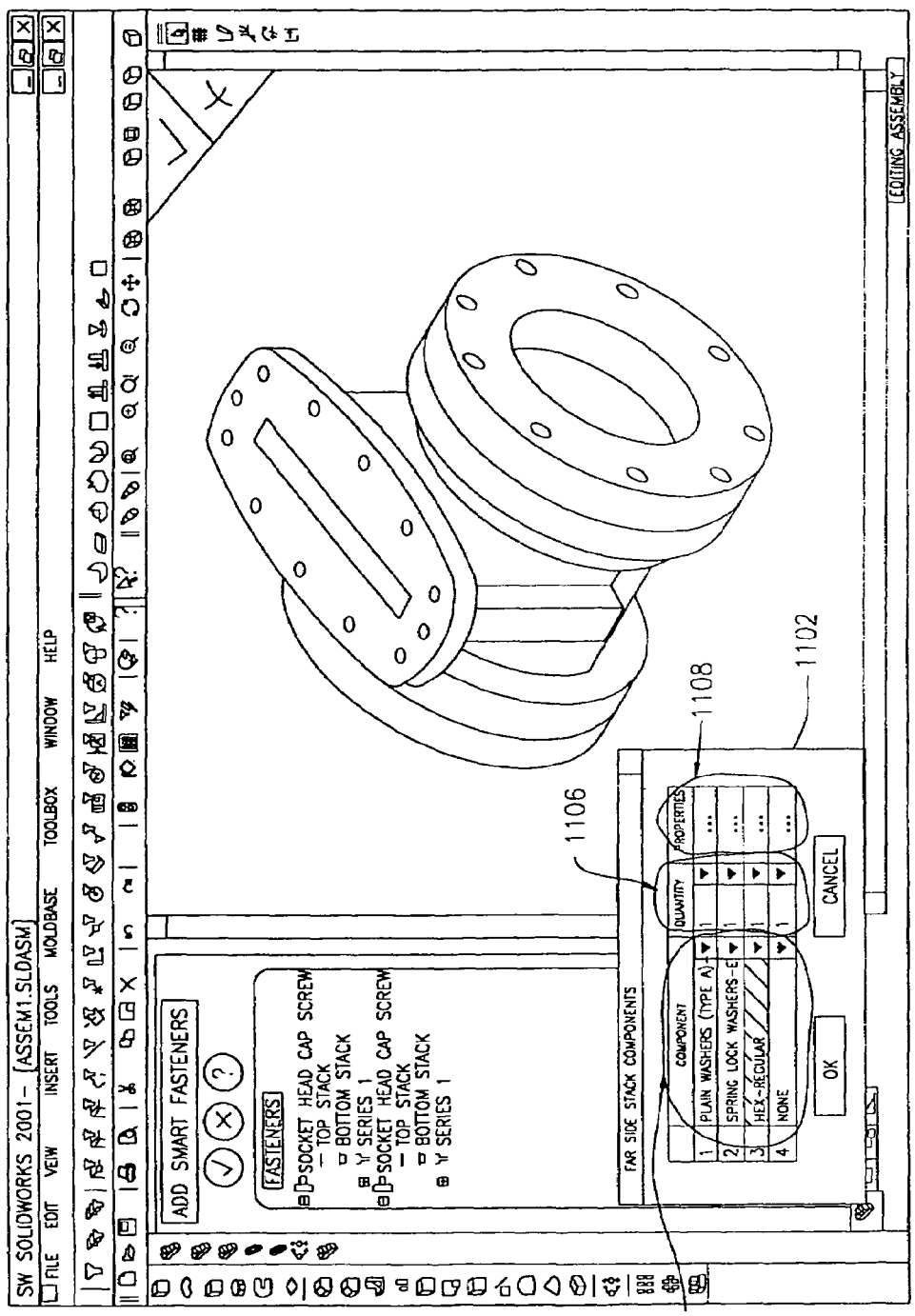
FIG. 11 is an illustration of a dialog box overlaid on a window containing a model.

Referring to FIG. 11, a dialog box 1102 aids the design engineer in selecting accessory components. The modeling system may display the dialog box 1102 after the design engineer indicates which features to accessorize. The design engineer is presented with only those accessory components that make physical sense with regards to forming a connection with the connector (e.g., accessory components having the appropriate size and use, in addition to being the correct standard). In the dialog box 1102, the design engineer selects one or more accessory components using pull-down menus in the component category 1104. A quantity for each selected accessory component is specified using pull-down menus in the quantity category 1106. Additionally, the design engineer may set custom properties for each component in the properties category 1108. An example of a custom property may be a thread for a hex nut. An accessory component is coupled directly to a connector, and therefore, a choice of accessory components may be determined based on attributes of connectors, rather than based on attributes of a feature. In some implementations, however, feature attributes may be used to select accessories. To retrieve an accessory component from the part library, two keys may be used: the first key may include attributes of the connector that the accessory is to be used with, the other key may identify a type of accessory component, for example, a top-side stacked component.

Another aspect of the invention is that the automated connection mechanism maintains all coupling relationships. When a feature and a part no longer have an appropriate coupling relationship due to a design change, the design engineer is notified so that the inappropriate coupling may be corrected. Maintaining coupling relationships is achieved using one or more watch objects. A watch object is cognizant of any parametric change in a feature that is coupled to a part retrieved from the part library. When a parametric change occurs, the watch object determines if the change caused the feature and part to become incompatible in such a way that the connection is no longer valid. If the connection is no longer valid, the design engineer is notified. The design engineer may then, for example, have the part automatically replaced with another part from the part library.

One watch object per connection is added to the assembly model once a part is retrieved from the part library and inserted into the assembly model. A watch object is a data structure that contains an array of programming objects. The programming objects monitor the parametric relationship between a feature and a connecting part. Each watch object has two pointers, one pointer is a reference to the feature and the other pointer is a reference to the connecting part incorporated in the assembly. The watch object may be added as a member (i.e., a node 301–312) of the assembly model data structure 300 (FIG. 3) and resides at the same hierarchical level in the assembly data structure as the retrieved part.

Fundamental to every parametric system is a mechanism that notifies the system that a particular object needs updating. The update mechanism may be triggered when any attribute of the feature or any attribute of the connecting part has changed. The update mechanism may be implemented as a broadcast process or as a cached data mechanism that stores pertinent object data for both the feature and part at the time of creation, including a time stamp or version designation.

In an implementation where the update mechanism uses cached data, when a watch object is referenced (e.g., upon traversal of the hierarchical data structure), the watch object compares some of the cached data with the data currently defining the feature and the connector. If cached data differs from the data that currently defines the feature in a significant way, a query is constructed to retrieve a part from the part library. If the part retrieved differs from the connecting part incorporated in the assembly, the design engineer is notified. If cached data differs from the data that currently defines the current connector in a significant way, the design engineer is also notified.

To notify the design engineer that the feature and connecting part may no longer be compatible, a CAD system that has implemented a feature manager design tree may display an exclamation point beside the name of the modified feature in the feature manager design tree's graphical user interface. Another method used to alert the design engineer may display a dialog box, which may also serve the purpose of aiding the design engineer in correcting the inappropriate coupling. The design engineer may correct the inappropriate coupling by modifying the feature once again or by commanding the automated connection mechanism to replace the part. Still another implementation may permit the replacement to occur automatically (e.g., by establishing a preference to do so).

The watch element is only active if the part library is present as a functioning software component. For example, if a model has one or more parts that were initially downloaded from a part library, during subsequent modeling sessions the CAD system must have a properly functioning part library for the watch element to be active.

Additionally, all coupling relationships between parts and accessory components are maintained using watch objects. Thus, the preceding discussion also applies to parts accessorized with other parts.

Another aspect of the invention is that the automated connection mechanism may be activated by a drag operation, whereby the object being dragged is a graphical representation of one member of a family of parts in the part library. Members of various families of parts may be depicted and previewed in a user interface panel. The graphical depiction may be dragged then dropped on a feature that appears in the 3D-modeling portion of the modeling window.

Figure 12A:
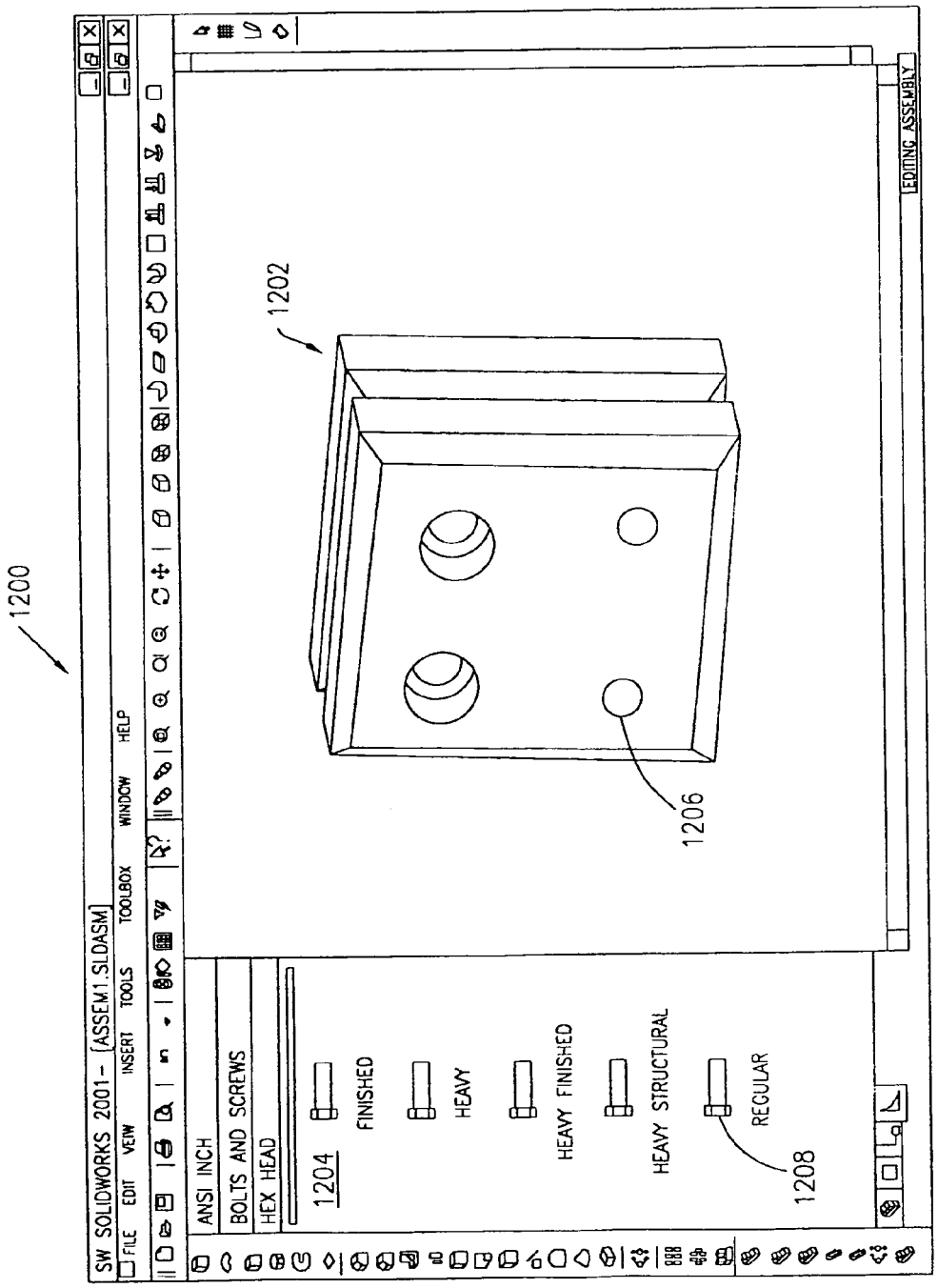
FIG. 12A is an illustration of a window containing part previews.
Figure 12:
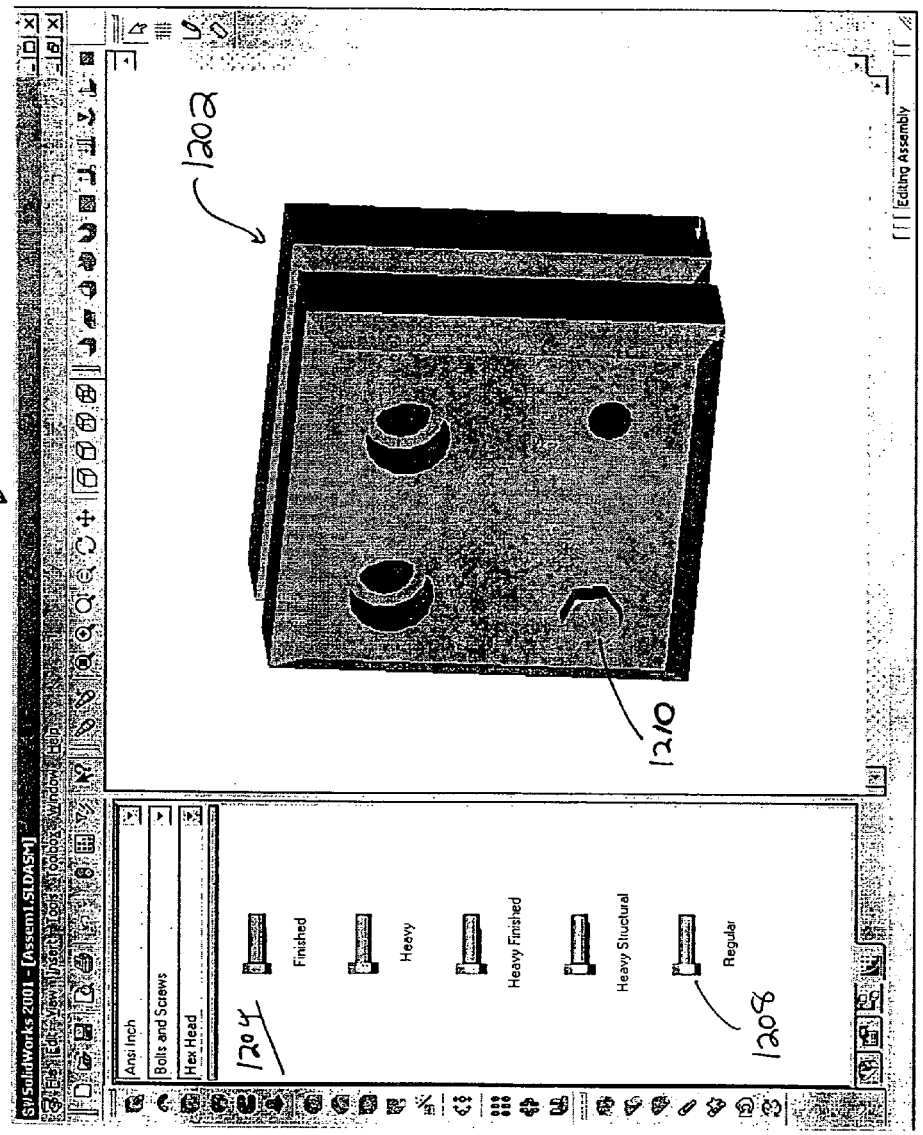
FIG. 12B is an illustration of a window after a part is dropped.

FIG. 12a shows an assembly 1202 in a window 1200. A graphical depiction of a part 1208 is displayed in the user interface panel 1204. The assembly 1202 has a feature 1206, which is a through hole and may be the target of a drag and drop operation. FIG. 12b shows the assembly 1202 in window 1200 after the graphical depiction of a part 1208 is dropped onto the feature 1206. When the part is dropped on the feature, the automated connection mechanism determines which configuration in the part family is the best fit for the feature upon which the graphical depiction is dropped, then creates an appropriate part 1210. The automated connection mechanism then automatically inserts the part 1210 in the model using a positioning procedure to correctly locate and align the part. Furthermore, a watch element is established for the connection, which permits the connection to be maintained.

In one embodiment, the feature is not changed if a part is dropped on a feature and the feature does not have a descriptor. Rather, the automated connection mechanism constructs a descriptor and stores the descriptor outside the feature's data structure. If the feature had a descriptor that does not match that of the connector that was dropped, the design engineer may permit the connector's descriptor to override the feature's descriptor.

The parts library may be extendible. In addition to functionality that is currently available, such as extending the part library by adding parts, a mechanism permits a design engineer to provide user-defined parametric connections that specify appropriate coupling relationships. A dialog box may be displayed to specify a descriptor for the part and to define the parametric connections. Additionally, the design engineer may modify the existing part library to reduce the number of parts that may be retrieved. Effectively reducing the size of the part library may be desirable to reflect existing inventory and to include only those parts that a corporation permits employees to purchase. To reduce the size of the part library, a part may be deleted or access to the part may be denied.

As should be appreciated by those skilled in the art, implementations of the described system may quickly and accurately populates features in an assembly model with appropriate connecting parts, including accessory components. The correct configuration of the connecting part is automatically chosen from a part library. The present invention may be applicable to many types of standards-based connections, for example, electrical connections or piping connections. Furthermore, although the description of the invention emphasizes parts, the present invention applies to other components as well, such as subassemblies.

The invention may be implemented in digital electronic circuitry, or in computer hardware, firmware, software, or in combinations of them. Apparatus of the invention may be implemented in a computer program product tangibly embodied in a machine-readable storage device for execution by a programmable processor, multiprocessor computer system, or computer cluster; and method steps of the invention may be performed by a programmable processor executing a program of instructions to perform functions of the invention by operating on input data and generating output. Each computer program may be implemented in a high-level procedural or object-oriented programming language, or in assembly or machine language if desired; and in any case, the language may be a compiled or interpreted language. Suitable processors include, by way of example, both general and special purpose microprocessors. Implementations may use a variety of database implementations including distributed databases, in-memory databases and data structures, flat-files storing data, or other data representations.

A number of embodiments of the present invention have been described. Nevertheless, it will be understood that various modifications may be made without departing from the spirit and scope of the invention. The present invention can be embodied in computer software code executable on a computer such as those well known in the industry, including IBM® compatible computers executing the Microsoft Windows® operating system, Sun® workstations, UNIX® or LINUX™ workstations, Apple® computers and any other computer device capable of executing software. In some parametric implementations, a design engineer may determine whether a feature or a part controls the parametric relationship between the two; alternatively, this relationship may be predetermined. The part library may be tightly integrated within the computer-aided modeling system (e.g., as programmed code and data structures), rather than reside as an external database. The part library and the features database also may be consolidated. The invention could also be used in conjunction with other computer-aided design software that addresses applications other than mechanical design.

Implementations may change the order in which operations are performed. Depending on the needs of an implementation, particular operations described herein may be implemented as a combined operation, eliminated, added to, or otherwise rearranged. Accordingly, other embodiments are within the scope of the following claims.

What is claimed is:

1. A computer-implemented method for construction of a three-dimensional model of a real-world object using a computer aided design system, the method comprising:
   constructing within the memory of a computer system the three-dimensional model of a real-world object by:
      constructing a feature of the three-dimensional model of the real-world object based on data input by a user; and
      automatically identifying a previously defined part from a part library, the part comprising a model of another three-dimensional object, said part being configured to compatibly couple with the feature, and the part being identified based on design attributes of the feature.

2. The method of claim 1 further comprising automatically positioning the identified part in a coupling relationship with the feature.

3. The method of claim 1 wherein identifying the part comprises selecting a part model from a part model library.

4. The method of claim 3 wherein the part model comprises a first component comprising an adjustable geometiy and identifying the part comprises adjusting the geometry of the first component based on an attribute of the feature.

5. The method of claim 4 further comprising:
   storing a new part in the part model library, the new part comprising an identified compatible part and the adjusted geometry.

6. The method of claim 4 wherein:
   the feature comprises a hole comprising a depth attribute;
   the selected part model comprises a model of a fastener;
   the adjustable geometry of the first component comprises a length of an axis of the fastener; and
   adjusting the geometry comprises computing a length of the axis based on the depth attribute of the hole.

7. A computer-implemented method for processing a three-dimensional design model of a real-world object generated by a computer-aided design system, the method comprising:
   constructing within the memory of a computer system the three-dimensional design model of the real-world object by:
      constructing a feature of the three-dimensional design model based on data received from a user; and
      automatically selecting a previously defined part from a part library, the part being configured to couple with the constructed feature, the part being selected from a parts library, the parts library comprising data representing a plurality of parts and at least one geometric characteristic of each of the parts.

8. The method of claim 7 further comprising automatically positioning the selected part in a coupling relationship with the constructed feature.

9. The method of claim 7 wherein constructing the feature comprises specifying a geometric characteristic of the constructed feature, the geometric characteristic of the constructed feature constraining a positioning of the part with respect to the constructed feature.

10. The method of claim 9 wherein selecting comprises selecting based on conformance between the geometric characteristic of the constructed feature and the at least one geometric characteristic of one of the plurality of parts in the parts library.

11. The method of claim 7 wherein the model data details construction of the design model based on a hierarchical relationship among components, the components being selected from the group consisting of a part, an assembly, and a subassembly.

12. A method of constructing a three-dimensional model of a real-world object using a computer-aided design system, the method comprising:
   constructing within the memory of a computer system the three-dimensional model of the real-world object by:
      selecting a feature of the three-dimensional model, said feature representing a physical element of the real-world object;
      generating a component configured to couple with the feature, said component modeling a second real-world object and said component being generated by:
         querying a component model repository storing previously defined components to retrieve a previously defined component model, said retrieving being based on compatibility between an attribute of the component model and a design attribute of the feature;
         constructing a first component from the component model; and
         establishing a coupling relationship between the first component and the feature.

13. The method of claim 12 wherein constructing the first component comprises:
   associating configuration data with an instance of the component model, the configuration data representing a value of a modifiable attribute of the component model.

14. The method of claim 13 wherein:
   the value is calculated based on an attribute of the feature.

15. The method of claim 12, wherein the coupling arrangement comprises a parametric relationship between the first component and the feature.

16. The method of claim 12 further comprising:
   receiving data from a user to modify the feature;
   automatically generating a modified component; and
   establishing a coupling relationship between the modified component and the modified feature.

17. The method of claim 16 wherein generating a modified component comprises:
   searching the repository for a second component based on an attribute of the modified feature;
   retrieving a second component model from the repository;
   constructing a second component from the second component model; and
   replacing the first component with the second component.

18. The method of claim 12 wherein querying the component model repository comprises formulating a database query using a description of the feature.

19. The method of claim 12 wherein the component model repository is extended by adding an additional component model.

20. The method of claim 12 wherein the component model can be removed from the component model repository.

21. The method of claim 12 wherein the component model comprises a configuration and a reference to a model representing a group of components.

22. The method of claim 21, wherein the configuration includes data that further specifies the model representing the group of components.

23. A computer-readable data storage medium comprising instructions for causing a computer to:
construct within the memory of a computer system a three-dimensional model of a real-world object, said instructions to construct within the memory further comprising instructions to:
construct a feature of the three-dimensional model of the real-world object based on data input by a user; and
automatically identify a previously defined part from a part library, the part comprising a model of another three-dimensional object, said part being configured to compatibly couple with the feature, the part being identified based on at least one design attribute of the feature.

24. The data storage medium of claim 23 wherein,
the feature comprises a hole comprising a depth attribute; and
the instruction to automatically identify a part comprise instructions to:
select a fastener part model comprising an adjustable length;
form a fastener part by associating length configuration data to the fastener part model, the length configuration data establishing the length of the fastener part based on the depth attribute of the hole;
automatically position the fastener part in a coupling relationship with the hole; and
store the fastener part in a part model library.

25. A computer-aided design system comprising:
a processing unit coupled to a database and a program storage medium, the database comprising a library of previously defined model parts and geometric characteristics of each part, and the program storage medium comprising instructions to configure the processor to construct within the memory of a computer system the three-dimensional design model of an object, said memory further comprising instructions to:
construct a feature of the three-dimensional design model based on input from a user; and
query the database to automatically construct a part from a model in the library of previously defined model parts, the constructed part being configured to couple with the feature.

26. The system of claim 25 wherein the program storage medium further comprises instructions to automatically position the constructed part in a coupling relationship with the feature.

27. The system of claim 25 wherein the processing unit comprises a computer cluster and the database comprises a remote distributed database.

28. The system of claim 25 wherein the instructions to construct the feature comprises instructions to receive from a user data specifying a geometric characteristic of the feature, the geometric characteristic constraining a positioning of the part with respect to the feature.

29. The method of claim 25 wherein the three-dimensional design model is represented by a hierarchical data structure detailing construction of the design model based on a hierarchical relationship among components, the components being selected from the group consisting of a part, an assembly, and a subassembly.

* * * * *